US012715757B2

(12) United States Patent
Wallace et al.

(10) Patent No.: US 12,715,757 B2
(45) Date of Patent: Aug. 25, 2026

(54) COMPACT PORTABLE VEHICULAR SADDLE RACK

(71) Applicants: Adam Wallace, North Potomac, MD (US); Christopher Wallace, North Potomac, MD (US)

(72) Inventors: Adam Wallace, North Potomac, MD (US); Christopher Wallace, North Potomac, MD (US)

(73) Assignee: Two Bays Equestrian, L.L.C., North Potomac, MD (US)

( * ) Notice: Subject to any disclaimer, the term of this patent is extended or adjusted under 35 U.S.C. 154(b) by 0 days.

(21) Appl. No.: 18/804,160

(22) Filed: Aug. 14, 2024

(65) Prior Publication Data

US 2025/0059021 A1 Feb. 20, 2025

Related U.S. Application Data

(60) Provisional application No. 63/520,080, filed on Aug. 16, 2023.

(51) Int. Cl.
*B68C 1/00* (2006.01)

(52) U.S. Cl.
CPC .................................... *B68C 1/002* (2013.01)

(58) Field of Classification Search
CPC ....... B62B 1/12; B62B 2202/40; A47B 81/00; B68B 9/00; B68C 1/001
See application file for complete search history.

(56) References Cited

U.S. PATENT DOCUMENTS

| | | | | | |
|---|---|---|---|---|---|
| 2,952,366 | A * | 9/1960 | Botten | B68C 1/002 | 211/104 |
| 3,780,971 | A * | 12/1973 | De Filipps | B68C 1/002 | 211/104 |
| 3,930,663 | A | 1/1976 | Scripter | | |
| 4,355,818 | A * | 10/1982 | Watts | B62B 1/26 | 280/654 |
| 5,362,078 | A | 11/1994 | Paton | | |
| 5,590,795 | A * | 1/1997 | Wright | A47B 81/00 | 211/104 |
| 5,953,889 | A | 9/1999 | Jones | | |
| 6,082,552 | A * | 7/2000 | Pollock | B62H 3/12 | 211/104 |
| 6,616,152 | B2 * | 9/2003 | Oliver | B68C 1/002 | 280/35 |

(Continued)

*Primary Examiner* — Patrick D Hawn
(74) *Attorney, Agent, or Firm* — J. Greg Tinch

(57) ABSTRACT

A compact portable vehicular saddle rack for transporting equestrian saddles in a vehicle interior cabin. This disclosure addresses the challenge of safely transporting expensive saddles from urban homes to rural riding areas. Disclosed is a lightweight, easy-to-install rack compatible with various car models and saddle types, securely restraining saddles to prevent damage during transit while maintaining cabin accessibility. This disclosure overcomes limitations of existing saddle racks designed for horse trailers or manual transportation, offering an affordable solution for individual riders. The disclosed apparatus protects saddles from adverse weather and potential warping, ensuring saddle integrity and horse comfort. This disclosure provides urban equestrians with a convenient means to transport equipment, bridging the gap between urban living and rural riding facilities.

16 Claims, 5 Drawing Sheets

(56) References Cited

U.S. PATENT DOCUMENTS

| | | | | |
|---|---|---|---|---|
| 6,929,269 | B2 | 8/2005 | Oliver | |
| 7,669,809 | B1 * | 3/2010 | Toner | B68C 1/002 248/150 |
| 7,942,277 | B1 * | 5/2011 | Flynn | B68C 1/002 211/1.53 |
| 8,464,994 | B2 * | 6/2013 | Chiu | F16M 11/38 144/286.5 |
| 8,517,413 | B2 * | 8/2013 | Chen | B25H 1/04 248/370 |
| 8,529,184 | B1 * | 9/2013 | Hanser | B68C 1/002 414/743 |
| 8,616,383 | B1 * | 12/2013 | Miller | B68C 1/002 211/1.51 |
| 10,464,806 | B1 * | 11/2019 | Shackleford | B68B 9/00 |
| 11,174,149 | B2 * | 11/2021 | Robles | F16M 13/022 |
| 12,043,298 | B2 * | 7/2024 | Suhling | B62B 5/06 |
| 2008/0203705 | A1 * | 8/2008 | Zimmerer | B62B 1/14 280/654 |
| 2011/0094984 | A1 * | 4/2011 | Barletta | B62B 3/02 211/85.8 |
| 2014/0338292 | A1 | 11/2014 | Abel | |
| 2014/0339184 | A1 * | 11/2014 | Couch | A47B 46/005 211/13.1 |
| 2017/0341924 | A1 * | 11/2017 | DeWitt | B60P 7/0815 |

* cited by examiner

COMPACT PORTABLE VEHICULAR SADDLE RACK

CROSS-REFERENCE TO RELATED APPLICATIONS

This patent application claims the benefit of U.S. Provisional Ser. No. 63/520,080 filed Aug. 16, 2023, which is herein incorporated by reference in its entirety.

FIELD OF DISCLOSURE

The field of disclosure is infrastructure for transporting saddling equipment for riding animals. More particularly, the field is equestrian saddle storage and transport equipment.

BACKGROUND

The subject of the instant disclosure is a vehicle-portable equestrian saddle rack designed and optimized for transport in the interior cabin of an automobile. The joint inventors are Adam Wallace and Christopher Wallace.

The present disclosure addresses the primary challenge of transporting equestrian saddles from urban residences to rural riding areas in a vehicle's interior cabin. Notably, urbanization has resulted in equestrian facilities being located far from riders' homes, leading to accessibility issues for urban dwellers. The conventional transportation solutions either risk damage or theft by storing the saddles at home or are impractical for car travel due to their design and lack of portability.

The primary problem addressed is the safe and efficient transportation of equestrian saddles in the interior cabin of an automobile from urban homes to rural riding locations. This problem stems from the expensive and delicate nature of saddles, coupled with the need to prevent damage during transit. In addition to the transportation issue, there is the problem of inadequate existing transportation solutions that fail to restrain saddles properly within a vehicle, thus risking damage and making other items in the cabin inaccessible. The solution of tethering the saddle to the bed of a flat-bed truck is illustrative of these problems and risks. Transporting a saddle in the bed of a truck can expose the saddle to adverse weather conditions which can permanently damage the saddle. Additionally, transporting a saddle without a proper framework could warp the saddle, and particularly the saddle panel. An uneven saddle panel can cause discomfort to the horse and cause accordingly a drop in performance.

A further issue is the economic impracticality of existing saddle racks designed for horse trailers, which do not cater to individuals or small-scale transport needs.

Manual transportation options, such as those employing hand trucks, are also unsuitable. These solutions do not offer the necessary compactness or protection for the saddles, especially over long distances or in adverse weather conditions. For example, U.S. Pat. No. 6,929,269 B2 discloses a saddle rack to transport at least one saddle mounted to a hand truck. This is a practical solution for transporting a saddle relatively short distances, like between locations on the same property. This solution is, however, impractical for transporting an equestrian saddle longer distances, like from an urban area to a rural one. Further, this solution is not compact.

In sum, there is a need for a car mobile equestrian saddle transportation solution that is affordable, easy to use, and does not damage the saddle. This disclosure teaches such a solution: a compact portable vehicular saddle rack. The aim of this disclosure is to teach an article that overcomes the problems discussed here and more.

The art contemplates solutions for transporting an equestrian saddle manually by mounting the saddle on a modified hand truck.

BRIEF SUMMARY OF DISCLOSURE

A first object of the present disclosure is to teach a lightweight, car portable, easy-to-install saddle rack that can be used to securely transport an equestrian saddle in the cabin of a car. Another object of the present disclosure is to teach a compact portable vehicular saddle rack saddle rack compatible with a wide range of car models and saddle types. Still another object of the present disclosure is to teach a compact portable vehicular saddle rack saddle rack that protects an equestrian saddle from being damaged during transport.

This disclosure achieves these and other objects and teaches a solution for safely and efficiently transporting an equestrian saddle in the interior cabin of a vehicle from urban homes to rural riding locations.

Additionally, this disclosure teaches a solution to restrain saddles properly within a vehicle thus preventing damage and preserving accessibility of other items in the vehicle cabin.

Furthermore, this disclosure teaches a solution that overcomes the limitations of existing saddle racks configured for horse trailers.

Furthermore, this disclosure teaches a solution for transporting saddles long distances without exposing the saddle to adverse weather or other elements.

BRIEF DESCRIPTION OF THE SEVERAL VIEWS OF THE DRAWING

An understanding of the present disclosure can be gained from the various embodiments and elements that are shown in the following figures, in which like reference numerals are intended to refer to like elements.

FIG. 2-1 is an isometric view of a compact portable vehicular saddle rack in an alternate compact state.

FIG. 2-2 is an elevation view of a compact portable vehicular saddle rack in an alternate compact state.

FIG. 3-1 is an isometric view of a compact portable vehicular saddle rack latch assembly.

FIG. 3-2 is a cross-section view of a compact portable vehicular saddle rack latch assembly in an alternate state.

Figure 1:
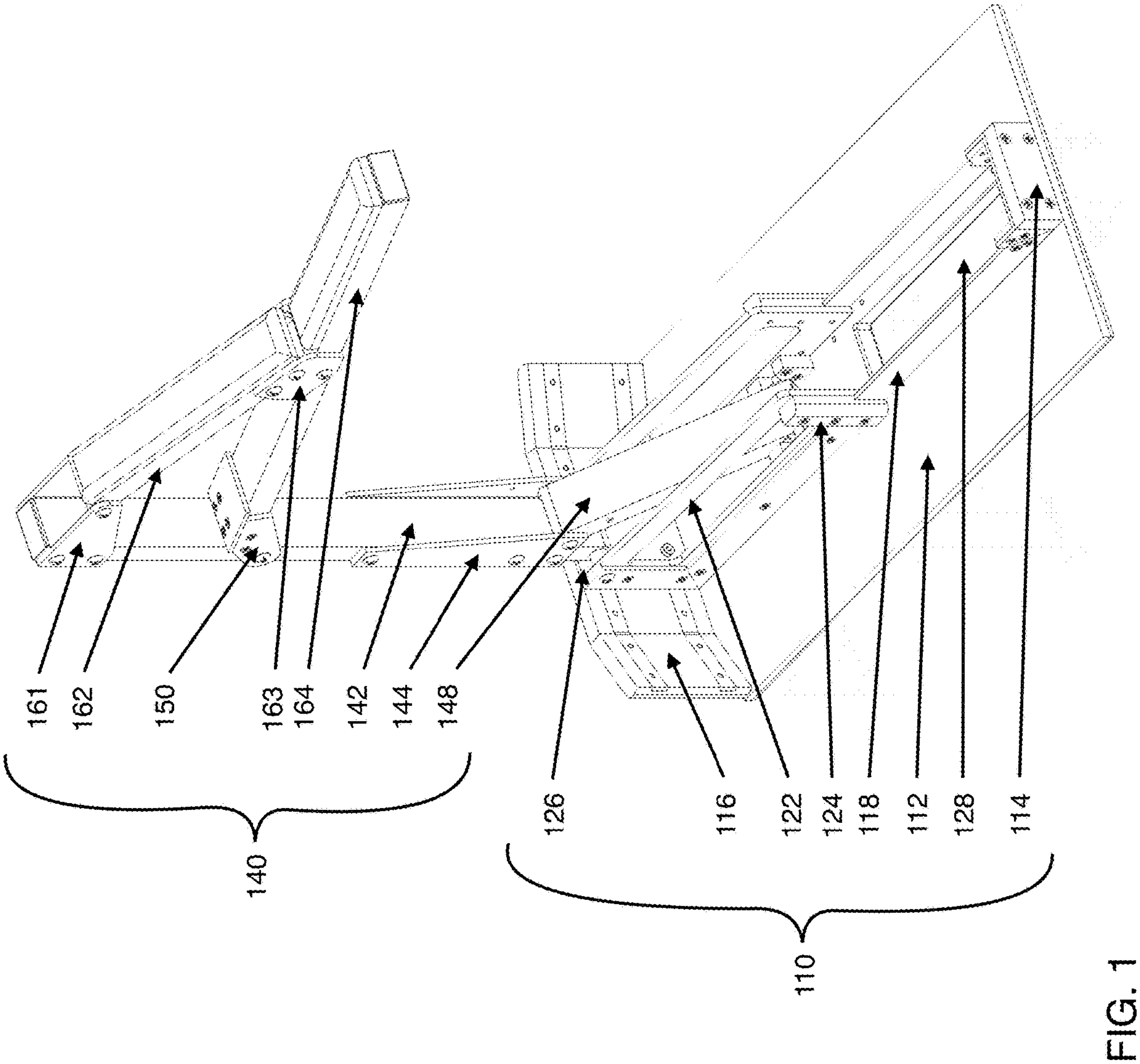
FIG. 1 is an isometric view of a compact portable vehicular saddle rack in a load-bearing state in accordance with the present disclosure.

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DISCLOSURE

A compact portable vehicular saddle rack is provided to facilitate transport of an equestrian saddle in the interior cabin of a vehicle. The invention is described by reference to various elements herein. It should be noted, however, that although the various elements of the inventive apparatus are described separately below, the elements need not necessarily be separate. The various embodiments may be interconnected and may be cut out of a singular block or mold. The variety of different ways of forming an inventive apparatus, in accordance with the disclosure herein, may be varied without departing from the scope of the invention.

Generally, one or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices and parts that are connected to each other need not be in continuous connection with each other, unless expressly specified otherwise. In addition, devices and parts that are connected with each other may be connected directly or indirectly through one or more connection means or intermediaries.

A description of an aspect with several components in connection with each other does not imply that all such components are required. To the contrary, a variety of optional components may be described to illustrate a wide variety of possible embodiments and in order to more fully illustrate one or more embodiments. Similarly, although process steps, method steps, or the like may be described in a sequential order, such processes and methods may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, or method is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Alternate implementations are included within the scope of various embodiments in which, for example, functions may be executed out of order from that shown or discussed, including substantially concurrently or in reverse order, depending on the functionality involved, as would be understood by those having ordinary skill in the art.

Apparatus

The apparatus of the present invention is comprised of the following elements illustrated below. The elements individually or in combination provide the benefits described above.

In an exemplary embodiment, for example, a compact portable vehicular saddle rack is configured to be securely tethered in the interior cabin of a vehicle. Objects of the device and system disclosed herein include easy and efficient transport of an equestrian saddle rack over long distances, safe and secure transport of an equestrian saddle rack in the interior cabin of a vehicle in the event of a collision, and a mode of transporting an equestrian saddle by vehicle that reduces wear, deterioration, and disfigurement of an equestrian saddle.

For context, specifications of exemplary equestrian saddles are provided herein. An exemplary English equestrian saddle seat from pommel to distal edge is generally between sixteen (16) inches and eighteen (18) inches, exclusive of additional padding, and weighs between ten (10) lbs. and twenty-five (25) lbs. An exemplary Western equestrian saddle length from pommel to distal edge is generally between six (6) to eight (8) inches longer than an English saddle and weighs between twenty-five (25) lbs. and sixty (60) lbs. Both English and Western equestrian saddles are large, irregularly shaped, and unwieldy. Transporting any species of equestrian saddle in the interior of a vehicle and not on an elevated rack, e.g. on the floor liner, threatens damage to the saddle. Damage to the underside of a saddle, for example, can render it uncomfortable for the horse and ultimately unusable. Thus, an object of this disclosure is a solution for transporting an equestrian saddle in an elevated position away from objects that may damage the saddle in transport.

Further, an object of the auto portable saddle rack disclosed is to occupy a small footprint when not in use, e.g. a configuration that collapses on itself to economize storage space. A further object is to disclose a solution that is structurally stable under load.

The prior art discloses solutions for suspending an equestrian saddle for short-term and long-term storage. See e.g. US2014/0338292 which discloses a saddle sling for supporting a saddle against a vertical support like a fence. The prior art further discloses solutions for transporting equestrian saddles short distances, e.g. from a barn to a stable on the same property. See e.g. U.S. Pat. No. 6,929,269 B2 which discloses a saddle rack to transport at least one saddle mounted to a hand truck. However, the art does not disclose a solution for transporting an equestrian saddle in the interior cabin of a vehicle in a suspended state. Further, the art does not disclose a solution for transporting an equestrian saddle configured for compact storage when not in active use.

Figures 1, 2:
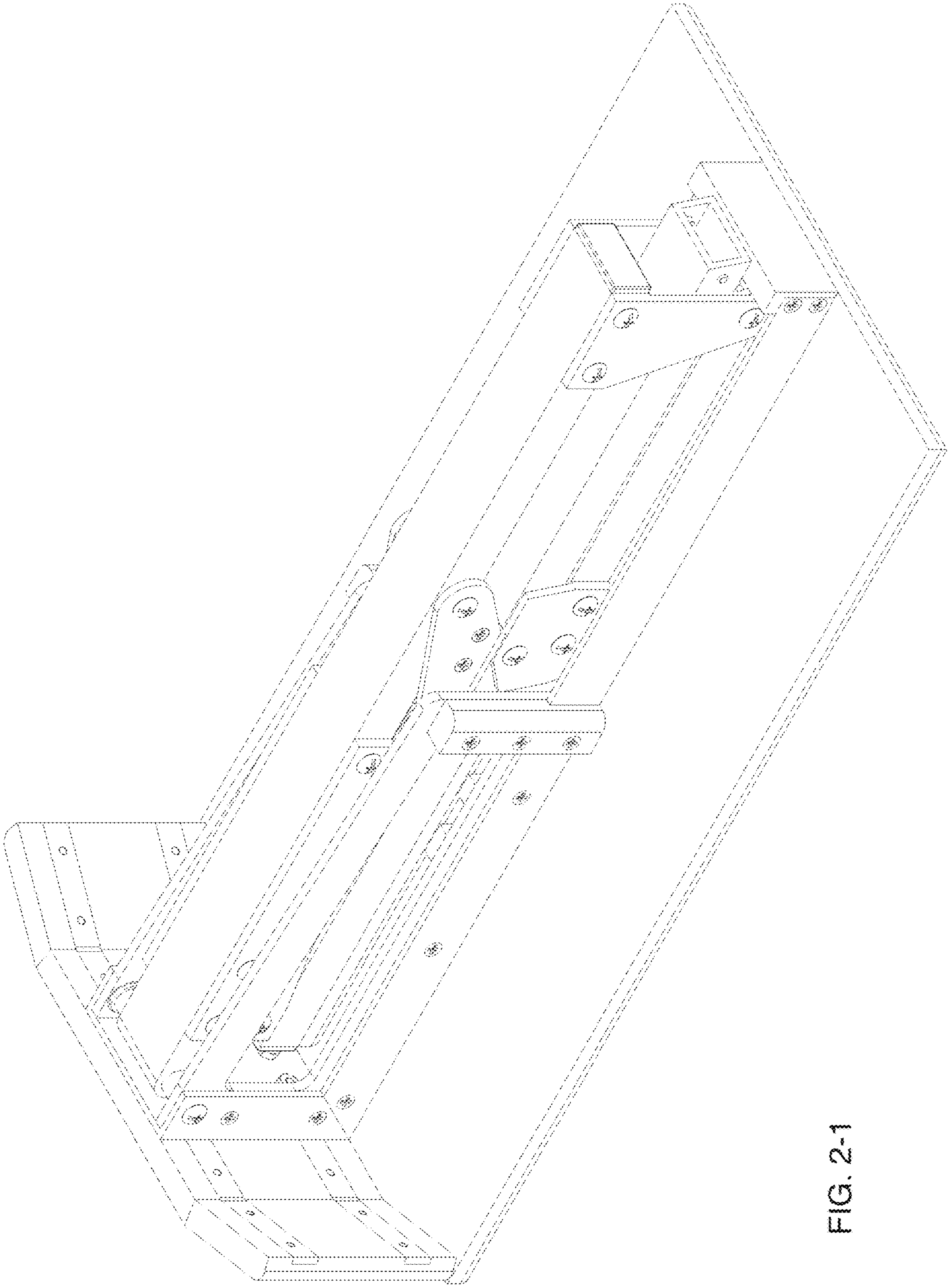
Figure 2:
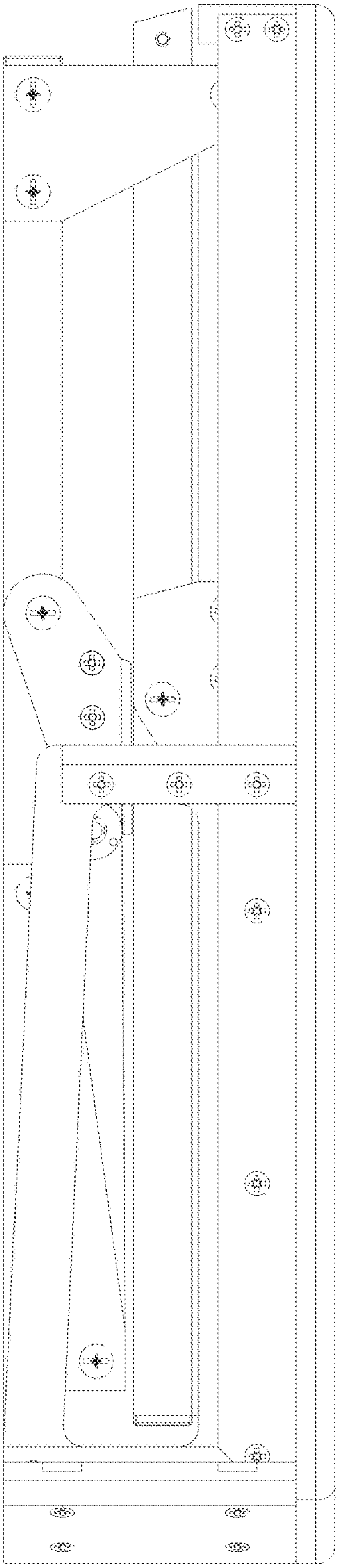
Figures 1, 3:
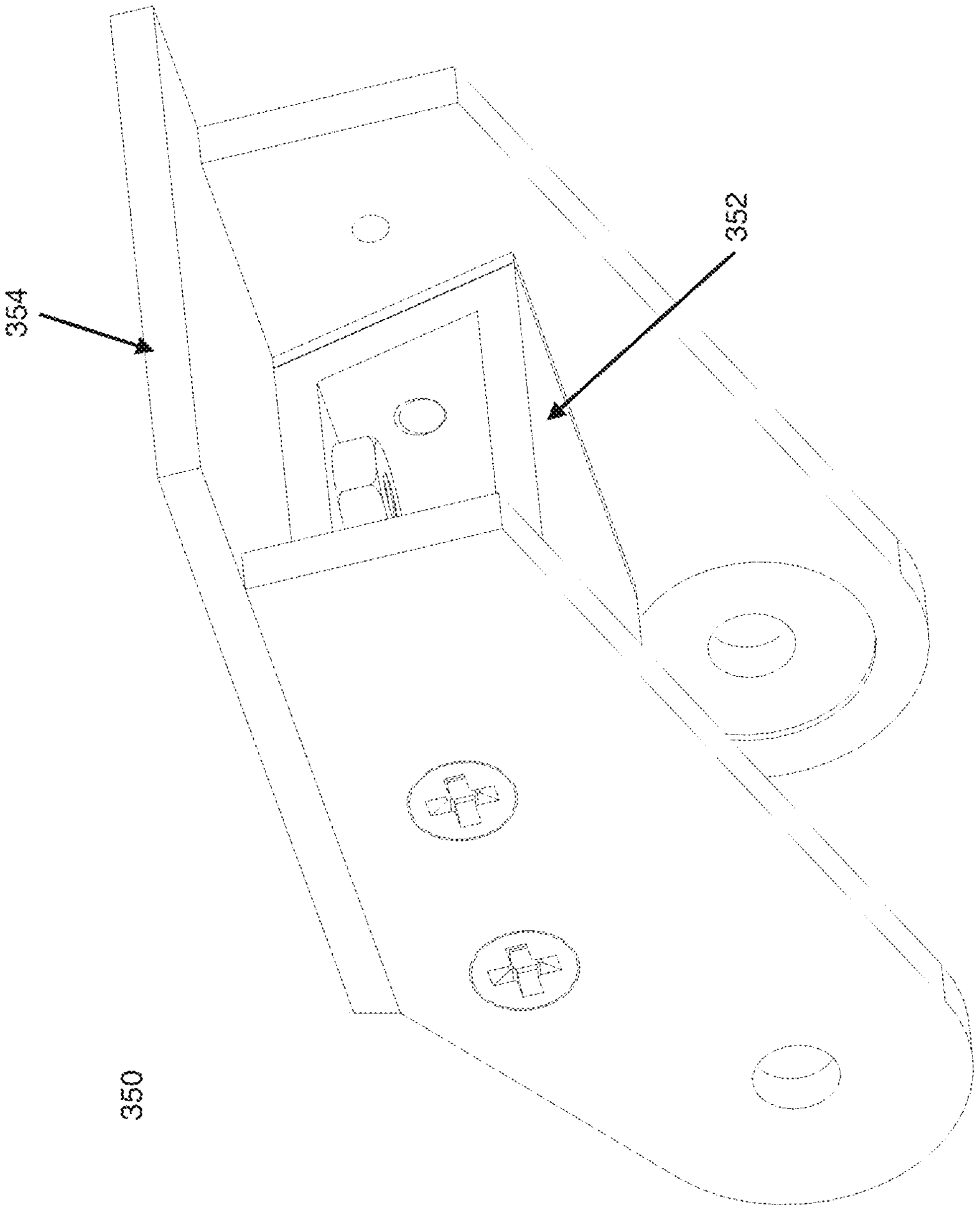
Figures 2, 3:
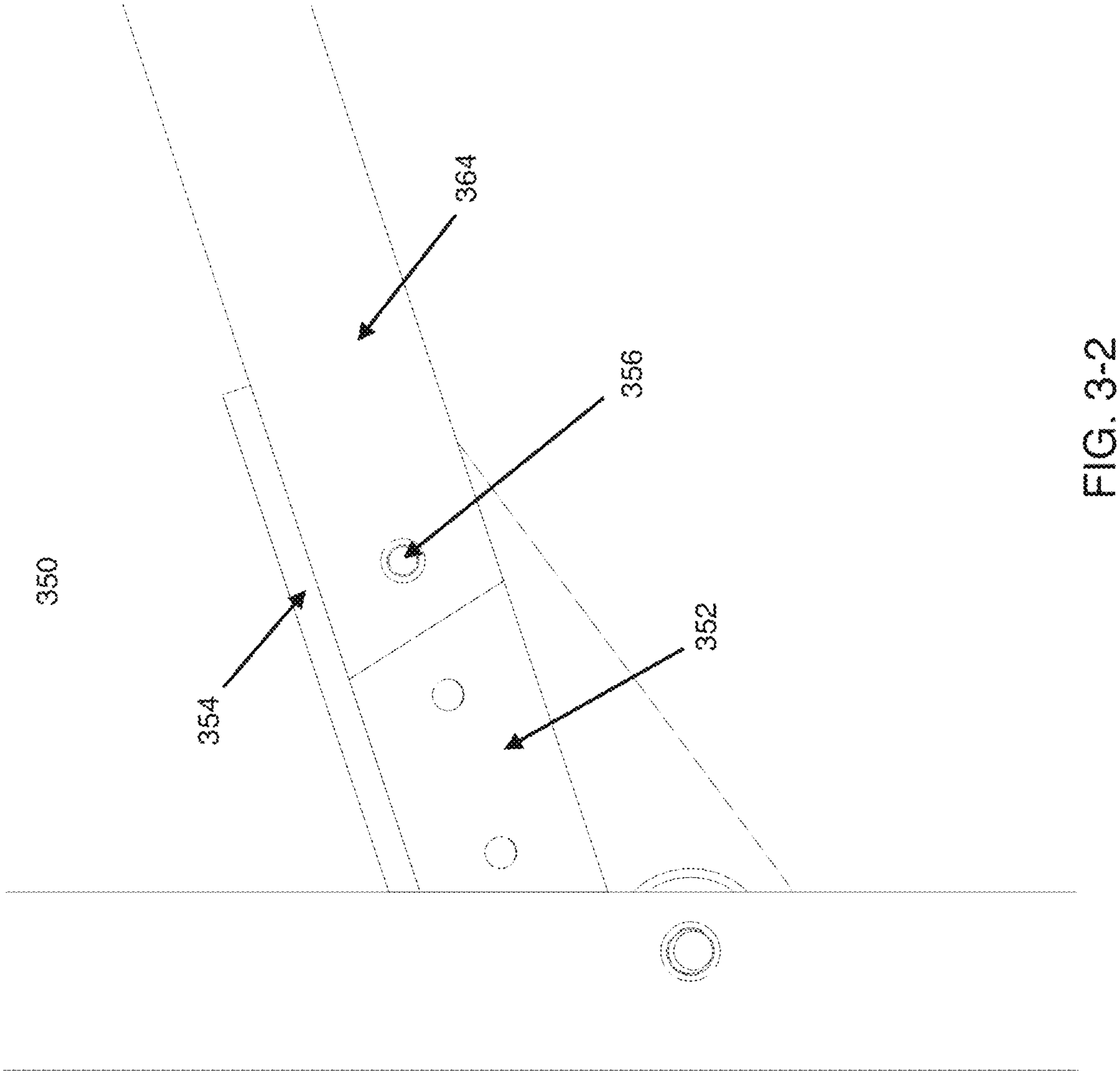

The following detailed description of example implementations refers to the accompanying drawings, specifically a compact portable vehicular saddle rack as illustrated in FIG. 1, FIGS. 2-1 and 2-2, and FIGS. 3-1 and 3-2. The same reference numbers in different drawings may identify the same or similar elements.

Some terms that are used herein are described in further detail as follows:

As used herein, the term "saddle" may refer to any variety of equestrian saddle.

As used herein, the term "vehicle" may refer to any passenger vehicle, including any three-wheel or four-wheel vehicle, whether manufactured primarily for use on public streets, roads, and highways, e.g. minivans and sport utility vehicles (SUVs), full-size pickups and larger vans, or manufactured principally for off-road use;

As used herein, the term "tubing" may refer to hollow metal tubing. In preferred embodiments shown and described, tubing may be substantially rectangular aluminum tubing having dimensions one and one-half inches by three-quarters of an inch. It will be apparent to one of ordinary skill in the art that the tubing shown and described can be replaced by solid members of sufficient tensile strength. Tubing was chosen to optimize the weight of the auto portable compact saddle rack without compromising its stability;

As used herein, the term "bracket" may refer to a structural member used to support or connect various components;

As used herein, the term "kickstand" refers to a support for the purpose of holding a device-in this case a saddle rack framework-in an upright position;

As used herein, the term "hinge" may refer to an axial pivot adapted to couple two structural members such that they move rotationally relative to another. As used herein, a hinge is anchored to one member and rotationally coupled to a second member axially at a pin:

As used herein, "car seat" refers to different seats found in the interior cabin of passenger vehicles including, but not limited to, bucket seats, bench seats, and split bench seats. The specifications for the car seat are described herein as follows: car seat width is measured in the lateral plane from door to door; car seat length/depth measured longitudinally from hood to trunk; and car seat height is measured vertically from floorboard to headliner.

FIG. 1 shows an exemplary implementation of a compact portable vehicular saddle rack. The compact portable vehicular saddle rack disclosed is an assemblage of two modules: a base module 110; and a framework 140.

In embodiments, a base module 110 may comprise: a bottom panel 112; a front panel 114 and a back panel 116. A base module 110 serves to position a compact portable vehicular saddle rack on a car seat, to stabilize the foundation of the entire device, and to buttress a vertical support 142 of a framework 140. In embodiments, a bottom panel 112 is flat and substantially rectangular with a top face and a bottom face. In embodiments, a front panel 114 is disposed on a bottom panel 112 opposite a back panel 116, substantially vertically and substantially parallel to back panel 116. In embodiments a front panel 114 may buttress a framework 140 thus preventing forward displacement of same. In embodiments a back panel 116 may be disposed substantially vertically at an edge of a bottom panel 112 opposite a front panel 114. In embodiments, a back panel 116 may be configured to match the contours of a vehicle backrest. Accordingly, in embodiments a back panel 116 may comprise a single piece, or may comprise multiple contiguous panels. In the exemplary embodiment shown in FIG. 1, back panel 116 comprises three contiguous panels arranged to simulate the contour of a vehicle backrest. In embodiments, the height of a back panel 116 is chosen to mechanically block counterclockwise rotation of vertical support 142. In embodiments, a base module 110 may further comprise a back panel insert 126 to mechanically block rotation of vertical support 142 and balance a compact portable vehicular saddle rack center of mass. In embodiments, vertical support 142 may rotate to one-hundred (100) degrees to facilitate seating and unseating of a kickstand 148. The back panel insert 126 prevents rotation of vertical support 142 beyond one-hundred (100) degrees to position the composite center of mass of a compact portable vehicular saddle rack and an equestrian saddle carried thereon above the center of the base module 110 thus enhancing the stability of the apparatus under load.

In embodiments, the framework may be removably coupled to the base. In an exemplary embodiment of a compact portable vehicular saddle rack 100, a bottom panel 112 may comprise the following specifications: approximately nineteen and one-half (19.5) inches in length from the side proximal to the framework to the side distal from the framework; ten (10) inches in width; and three and three-quarters (3.75) inches tall. These specifications are chosen in view of exemplary vehicle backrest specifications and minimum height to mechanically block counterclockwise rotation of vertical support 142. In embodiments, such as the exemplary embodiment shown in FIG. 1, back panel 112 may comprise three contiguous panels with the outer panels disposed at twenty-degree (20 deg) angles with the center panel to approximate the contour of a bucket car seat. For reference, and while car seat specifications vary by manufacturer, an exemplary car seat backrest may be between eighteen (18) and twenty-four (24) inches tall, and between thirteen (13) and seventeen (17) inches wide. In embodiments, a compact portable vehicular saddle rack in a load-bearing state has sufficient clearance from a vehicle headliner to carry an equestrian saddle. A front panel 114 may act as a buffer to protect the car seat from being damaged by a corner of a compact portable vehicular saddle rack during installation or use. In an exemplary embodiment of a compact portable vehicular saddle rack 100, a front panel 114 may be one and one-quarter (1.25) inches tall and three (3) inches wide.

In embodiments, a base module 110 may be optimized for compact storage. In embodiments, a base module 110 may further comprise an anchor 118. In embodiments as shown in FIG. 1 an anchor 118 may comprise a substantially rectangular cavity inflexibly coupled to bottom panel 112. In embodiments, an anchor 118 runs substantially the length of bottom panel 112. In embodiments, an anchor 118 may be configured with a notch such that a kickstand 148 may be removably coupled thereto.

In embodiments an anchor may extend vertically up back panel 116 such that vertical support 142 is rotationally coupled thereto to facilitate clockwise rotation of the framework 140 relative to base module 110.

In embodiments, a base module 110 may further comprise a first side rail and a second side rail 122. In embodiments, a first and second side rail 122 is disposed on either side of the narrow sidewall of an anchor 118. In embodiments, a first and second side rail 122 is inflexibly coupled to an anchor 118.

In embodiments, compact portable vehicular saddle rack 100 may be configured to be secured by tethering to a vehicle seat. In embodiments a base module 110 may further comprise an at least first seatbelt pad 124 inflexibly coupled to an outfacing side of a first side rail and second side rail 122. In embodiments, an at least first seatbelt pad may be disposed on the outfacing sides of a first side rail and a second side rail 122 such that a passive car restraint, like a seatbelt, may be stretched across a base module 110 proximal to a seat belt pad and fastened securely against the car seat. In embodiments, a base module 110 may further comprise additional anchoring mechanisms to secure a compact portable vehicular saddle rack 100 to a car seat, or the vehicle's chassis.

In embodiments, a compact portable vehicular saddle rack base may comprise a cavity 128 carved from bottom panel 112 to reduce the overall height of a compact portable vehicular saddle rack in an alternate compact state. In embodiments of a compact portable vehicular saddle rack a cavity 128 may be defined substantially from the dimensions of the first saddle extend arm 162. In embodiments, a second saddle extend arm 164 may be approximately the same length as bottom panel 112.

The second of the primary modules shown in FIG. 1 is a framework 140. In embodiments of a compact portable vehicular saddle rack 100, a framework 140 may comprise a vertical support 142, a kickstand bracket 144, a kickstand 148, a latch assembly 150; a saddle extension bracket 161, a first saddle extend arm 162 having a first end proximal to the vertical support 142 and a second end distal from the vertical support 142; an extend hinge 163; and a second saddle extend arm 164 having a first end proximal to the first saddle extend arm 162, a second end distal from first saddle extend arm 162, and a midpoint.

In embodiments, a framework 140 is configured for vertical stability under load such that an equestrian saddle may rest on a first saddle extend arm 162 and a second saddle extend arm 164 while vertical support 142 remains in a substantially vertical position. In embodiments, a framework 140 is configured to transition to an alternate compact state by repositioning its constituent members into a stack contiguous with base module 110.

In embodiments a vertical support 142 may have a first end proximal to the base module 110, a second end distal from the base and a midpoint.

In embodiments, a framework 140 may be configured to be load-bearing in a first substantially vertical state such that vertical support 142 is perpendicular to base module 110. In embodiments, a framework 140 may further comprise a kickstand 148 coupled to vertical support 142 to counterbalance torque and stabilize the framework 140 in the load-bearing state shown in FIG. 1. In embodiments a kickstand 148 may be rotationally coupled to a vertical support 142 at a kickstand bracket 144. In embodiments, a kickstand bracket 144 may be two brackets disposed on opposite sides of the vertical support 142.

In embodiments, vertical support 142 and kickstand 148 may be metal tubing. In embodiments, a kickstand 148 may further comprise pins to removably couple the kickstand 148 to base module 110 at a notch.

In an exemplary embodiment of a compact portable vehicular saddle rack 100, the length of vertical support 142 may be between eighteen (18) and nineteen (19) inches. In an exemplary embodiment of a compact portable vehicular saddle rack 100, the length of kickstand 148 may be seven and one-half (7.5) inches. In embodiments, the length of a first saddle extend arm 162 is roughly equivalent to the length of a second saddle extend arm 164 from midpoint to distal end. Specifications of each of a first saddle extend arm 162 and a second saddle extend arm 164 are chosen to facilitate compact folding of a compact portable vehicular saddle rack in an alternate compact state. Additionally, specifications of each of a first saddle extend arm 162 and a second saddle extend arm 164 are chosen such that their relative positions when a compact portable vehicular saddle rack is in a load-bearing state broadly tracks the frame of a horse. In an exemplary embodiment of a compact portable vehicular saddle rack, latch assembly 150 may, in its engaged state, form an approximately seventy-two degrees (72 deg) angle relative to vertical support 142 (e.g. from the vertical support 142 clockwise to the latch assembly 150).

In embodiments of a compact portable vehicular saddle rack 100, specifications of a vertical support 142 are chosen in view of a standard car seat and backrest and overall interior cabin height. According to an exemplary embodiment, the overall height of a compact portable vehicular saddle rack 100 in a load-bearing state is twenty-one and three-quarters (21.75) inches.

In embodiments, a first saddle extend arm 162 may have a first end proximal to the vertical support 142 and a second end distal from the vertical support 142. In embodiments, a second saddle extend arm 164 may have a first end proximal to the first saddle extend arm 162, a second end distal from first saddle extend arm 162, and a midpoint.

In embodiments, a first saddle extend arm 162 may be rotationally coupled at a first end to vertical support 142 and rotationally coupled to a second saddle extend arm midpoint 164. In embodiments, a second saddle extend arm second end 164 is configured to engage at a latch assembly 150 thereby causing the saddle rack extension 160 to form a stable load-bearing shelf for an equestrian saddle.

In embodiments, a first saddle extend arm 162 and a second saddle extend arm 164 engage at a latch assembly 150 to form a stable perch for an equestrian saddle to rest. Specifically, in embodiments, a first saddle extend arm 162 and a second saddle extend arm 164 are configured to fit snugly in the gullet channel of an equestrian saddle. In embodiments, engage mechanism is torque applied by the weight of the equestrian saddle on the first saddle extend arm 162 and second saddle extend arm 164 such that second saddle extend arm 164 engages latch assembly 150. In embodiments, latch assembly 150 may be fitted with a press fit ball plunger to lock the second saddle extend arm 164 in position. In embodiments, a first saddle extend arm 162 and a second saddle extend arm 164 may be metal tubing. In embodiments a first saddle extend arm 162 may be rotationally coupled to a vertical support 142 at a saddle extension bracket 161. In embodiments, a first saddle extend arm 162 may be rotationally coupled to a second saddle extend arm 164 at a extend hinge 163. In embodiments, first saddle extend arm 162 and second saddle extend arm 164 are fitted with soft material to form a protective layer between both the horizontal members and the equestrian saddle.

In an exemplary embodiment of a compact portable vehicular saddle rack 100, the length of first saddle extend arm 162 may be eight and one-quarter (8.25) inches. In an exemplary embodiment of a compact portable vehicular saddle rack 100, the length of second saddle extend arm 164 may be eighteen (18 inches). In embodiments of a compact portable vehicular saddle rack, the length of the second saddle extend arm 164 is optimized to conform to the dimensions of an equestrian saddle gullet. In embodiments, a first saddle extend arm 162 and a second saddle extend arm 164 may be fitted with a restraint like a strap to secure a saddle for transport. In embodiments, the first saddle extend arm and the second saddle extend arm may be fitted with a soft cover.

In an exemplary embodiment of a compact portable vehicular saddle rack 100, a vertical support 142, a first saddle extend arm 162, a second saddle extend arm 164, and a kickstand 148 may be aluminum tubing to economize the weight of compact portable vehicular saddle rack 100 without compromising durability or exploding manufacturing costs.

In embodiments, a compact portable vehicular saddle rack 100 is configured such that framework 140 may be collapsed into an alternate compact state. See e.g. FIG. 2-1 and FIG. 2-2. Specifically, when a compact portable vehicular saddle rack is in an alternate compact state the framework 140 is stacked such that first saddle extend arm 162 is stacked contiguous to base module 110 at channel 128; second saddle extend arm 164 stacked on first saddle extend arm 162; kickstand 148 stacked on second saddle extend arm 164; vertical support 142 stacked on kickstand 148.

FIG. 2-1 and FIG. 2-2 show an embodiment of a compact portable vehicular saddle rack in an alternate compact state. In embodiments, a compact portable vehicular saddle rack saddle rack is configured to collapse from a load-bearing state as shown in FIG. 1, into an alternate compact state that is substantially flat and horizontal as shown in FIG. 2-1. One advantage of the embodiment shown is enhanced portability: a compact portable vehicular saddle rack in an alternate compact state, as shown in FIG. 2-1, occupies a substantially smaller footprint than the load-bearing state, and is thus optimized for compact storage. Furthermore, the compact portable vehicular saddle rack in the alternate compact state need not be secured with a passive vehicle restraint like a seatbelt, and accordingly, may be transported in a smaller space with tight tolerances, e.g. in the interior cabin on the floor liner under a car seat, in a trunk, or even in a bed of a truck. In an exemplary embodiment of a compact portable vehicular saddle rack, the overall vertical height in an alternate compact state is approximately four and one-quarter (4.25) inches.

A method for adapting a vehicle interior to transport equestrian saddles comprises providing a car portable vehicle saddle rack, e.g. the embodiment shown in FIG. 1 and FIGS. 2-1 and 2-2, and same in an upright load bearing state wherein the framework is immovably engaged with vertical support disposed substantially vertically and perpendicular to the base and the second saddle extend arm immovably engaged, disposed substantially horizontal and parallel to the base. Consistent with this method, a car portable vehicular saddle rack may be released from the upright load bearing state and collapsed to a compact unloaded state with vertical support stacked contiguous to the base, kickstand and first saddle extend arm end-to-end stacked contiguous to vertical support, and first saddle extend arm stacked contiguous to kickstand and first saddle extend arm.

FIGS. 3-1 and 3-2 show views of an exemplary embodiment of a latch assembly 350. FIG. 3-1 shows a perspective view of an exemplary compact portable vehicular saddle rack latch assembly 350 in accordance with the present disclosure. In embodiments, a latch assembly 350 may further comprise a latch core 352, and a latch shell 354. In embodiments, latch core 352 and second saddle extend arm 364 have complementary beveled edges. In embodiments, a beveled edge of latch core 352 and a beveled edge of second saddle extend arm 364 are disposed at complementary seventy-six (76) degree angles. The weight of the saddle on the second saddle extend arm 364 creates torque that is greatest at the juncture of second saddle extend arm 364 and latch core 352, which causes the second saddle extend arm 364 to immovably couple with the latch assembly 350 at latch core 352. Thus, latch core 352 has the advantage of enhancing stability of the second saddle extend arm 364 when the latch assembly 350 engaged. In embodiments, a latch shell 354 encloses a latch core 352. In an exemplary embodiment of a compact portable vehicular saddle rack, latch core 352 is immovably coupled to latch shell 354 with a fastener, by welding, or by another fastening means or adhesive. In embodiments, a latch shell 354 may comprise multiple panels welded together, or otherwise fastened or fused to form a contiguous piece. In embodiments, latch shell 354 may be a single piece. In embodiments, latch core 352 and latch shell 354 may be fused into a single piece.

FIG. 3-2 shows a cross-section view of a latch assembly 350 when engaged with second saddle extend arm 364 at latch core 352. In embodiments, latch assembly 350 engages a latch core 352 at second saddle extend arm 364 to form a contiguous substantially horizontal stable weight-bearing support. In embodiments, a beveled edge of latch core 352 and a beveled edge of second saddle extend arm 364 are disposed at inverted seventy-six (76) degree angles. The weight of the saddle on the second saddle extend arm 364 creates torque which in turn causes the second saddle extend arm 364 to immovably couple with latch assembly 350 at beveled edge of latch core 352. Thus, latch core 352 has the advantage of enhancing stability of the second saddle extend arm 364 when second saddle extend arm 364 engaged at latch assembly 350. In embodiments, a latch shell 354 is configured to counterbalance torque from weight of equestrian saddle on second saddle extend arm 364 applied at the juncture of latch core 352 and second saddle extend arm 364. In the exemplary embodiment shown in FIG. 3-2 second saddle extend arm 364 further comprises a self-seating latch 356. In embodiments a self-seating latch 356 may be a ball plunger.

Additional Considerations

The above description is illustrative and is not restrictive. As a case in point, an embodiment may remove the hinge joints such that the auto portable compact saddle rack is not foldable. Similarly, the embodiments disclosed may be used outside of the car. Such an embodiment solves one, but not all, key objects of this disclosure.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

One or more features from any embodiment can be combined with one or more features of any other embodiment without departing from the scope of the disclosure.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and Bis false (or not present), A is false (or not present) and Bis true (or present), and both A and B are true (or present).

A recitation of "a," "an," or "the" is intended to mean "one or more" unless specifically indicated to the contrary.

Many variations of the disclosure will become apparent to those skilled in the art upon review of the disclosure. The scope of the disclosure should, therefore, be determined not with reference to the above description, but instead should be determined with reference to the pending claims along with their full scope of equivalents.

We claim:

1. A passenger vehicle compact portable vehicular saddle rack comprising:
- a base having a first end proximal to a framework and a second end distal from the framework;
- the base lacking integrated wheels or casters and configured to be an immobile support structure for the passenger vehicle saddle rack;
- the framework mechanically coupled to the base having
  - a vertical support with a first end proximal to the base and a second end distal from the base,
  - a latch disposed approximately at the midpoint of the vertical support;
  - a first saddle extend arm having a first end proximal to a vertical support and a second end distal from the vertical support,
  - a second saddle extend arm having a midpoint, and
  - wherein the first saddle extend arm first end is rotationally coupled to the vertical support and the first saddle extend arm second end is rotationally coupled to the second saddle extend arm at its midpoint, and wherein the base further comprises at least a first anchor disposed on top of the base configured for tethering a passive vehicle restraint.

2. The passenger vehicle saddle rack according to claim 1, wherein the base further comprises a front panel disposed at the second end of the base and a back panel disposed at the first end of the base.

3. The passenger vehicle saddle rack according to claim 1, wherein the base further comprises a retaining wall disposed at the first end of the base proximal to the vertical support.

4. The passenger vehicle saddle rack according to claim 1, wherein the base further comprising a cavity conforming to the dimensions of the vertical support, the first saddle extend arm and second saddle extend arm at 0 deg angle with the base and stacked vertically.

5. The passenger vehicle saddle rack according to claim 1, the base further comprising a notch;
- the framework further comprising a kickstand rotationally coupled to the vertical support at an approximate midpoint of the vertical support; and
- wherein the framework is rotationally coupled to the base.

6. The passenger vehicle saddle rack according to claim 1, wherein the vertical support is substantially the same length as, and no longer than, the base from the first end to the second end.

7. The passenger vehicle saddle rack according to claim 1 wherein the second saddle extend arm is approximately twice the length of the first saddle extend arm; and wherein the second saddle extend arm and the base extend approximately the same distance from the vertical support.

8. The passenger vehicle saddle rack according to claim 1, the latch having a core having a flat edge proximal to the vertical support and a beveled edge distal to the vertical support, wherein the second saddle extend arm having a beveled edge distal from the joint with the first saddle extend arm, wherein the angles of the core and the second saddle extend arm, respectively, are inverted.

9. The passenger vehicle saddle rack according to claim 1, the latch further comprising a ball plunger.

10. The passenger vehicle saddle rack according to claim 1, wherein the vertical support, the latch, the first saddle extend arm, and the second saddle extend arm are aluminum tubing.

11. The passenger vehicle saddle rack according to claim 1, wherein the first saddle extend arm and the second saddle extend arm have a soft cover.

12. The passenger vehicle saddle rack according to claim 1, wherein the first saddle extend arm and the second saddle extend arm have a strap.

13. The passenger vehicle saddle rack according to claim 1, wherein the framework removably coupled to the base.

14. A passenger vehicle saddle rack comprising:
- a framework having
  - a vertical support with a first end distal from a first saddle extend arm and a second end proximal to the first saddle extend arm,
  - a latch disposed approximately at the midpoint of the vertical support, rotationally coupled thereto, the latch further comprising a core having a flat edge proximal to the vertical support and a beveled edge distal from the vertical support;
  - the first saddle extend arm having a first end proximal to the vertical support and second end distal from the vertical support,
  - a second saddle extend arm having a midpoint and having a beveled edge distal from the first saddle extend arm, and
  - wherein the first saddle extend arm first end is rotationally coupled to the vertical support and the first saddle extend arm second end is rotationally coupled to the second saddle extend arm midpoint, and wherein the beveled edge of the core and the beveled edge of the second saddle extend arm are inverted relative to each other.

15. A passenger vehicle saddle rack comprising:
- a base having
  - a first end proximal to a framework and a second end distal from a framework, a cavity substantially defined by the dimensions of the second saddle extend arm, the first saddle extend arm, and the vertical support each laid horizontally and stacked contiguously on one another, at least a first notch disposed on top of the base, at least a first anchor disposed on top of the base, a back panel disposed on top of the base proximal to the first end of the base, and a front panel disposed on top of the base proximal to the second end of the base;

the framework rotationally coupled to the base having a vertical support having a first end proximal to the base, a second end distal from the base and a midpoint, a kickstand rotationally coupled to the vertical support proximal to the midpoint, a latch rotationally coupled to the vertical support having a core with a beveled edge distal from the vertical support, a first saddle extend arm having a first end rotationally coupled to the vertical support second end and a second end rotationally coupled to a midpoint of a second saddle extend arm, a second saddle extend arm having a first end proximal to a first saddle extend arm and a second end distal from a first saddle extend arm and a midpoint, the second end of the second saddle extend arm having a beveled edge disposed inverse to the latch core beveled edge, wherein the second saddle extend arm second end is configured to immovably couple with the vertical support at the latch, and wherein the kickstand configured to immovably couple to the base at the notch.

16. The passenger vehicle saddle rack according to claim 15 wherein the framework is configured to be collapsed on the base at the cavity such that the second saddle extend arm is stacked contiguous with the base, the at least first saddle extend arm and kickstand are stacked contiguous with the second saddle extend arm, and the vertical support is stacked contiguous with the first saddle extend arm and the kickstand.

* * * * *